US008024109B2

(12) United States Patent
Fuwa et al.

(10) Patent No.: US 8,024,109 B2
(45) Date of Patent: Sep. 20, 2011

(54) ABNORMALITY DETERMINATION APPARATUS FOR INTAKE AMOUNT CONTROL MECHANISM

(75) Inventors: Naohide Fuwa, Toyota (JP); Kiyoo Hirose, Nagoya (JP); Yuuji Miyanoo, Seto (JP); Yuichiro Ido, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 64 days.

(21) Appl. No.: 12/382,736

(22) Filed: Mar. 23, 2009

(65) Prior Publication Data

US 2009/0188307 A1 Jul. 30, 2009

Related U.S. Application Data

(62) Division of application No. 11/244,044, filed on Oct. 6, 2005, now Pat. No. 7,527,027.

(30) Foreign Application Priority Data

Oct. 19, 2004 (JP) ................................ 2004-304770

(51) Int. Cl.
*G06F 19/00* (2011.01)
*F02D 11/10* (2006.01)
*G01M 15/00* (2006.01)

(52) U.S. Cl. ...... 701/114; 701/103; 123/396; 73/114.31

(58) Field of Classification Search .................. 123/345, 123/346, 391, 396, 90.11, 90.15–90.18, 339.14, 123/339.11, 339.15, 347, 348, 361, 399, 123/403; 701/107, 101–103, 110, 114; 73/114.31, 73/114.36, 114.37

See application file for complete search history.

(56) References Cited

U.S. PATENT DOCUMENTS

| | | | | |
|---|---|---|---|---|
| 4,491,109 | A * | 1/1985 | Kishi et al. | 123/339.15 |
| 6,213,068 | B1 | 4/2001 | Hassdenteufel | |
| 6,513,467 | B2 | 2/2003 | Nohara et al. | |
| 6,792,914 | B2 * | 9/2004 | Fuwa | 123/399 |
| 6,848,418 | B1 * | 2/2005 | Summers et al. | 123/339.11 |
| 6,932,034 | B2 | 8/2005 | Machida et al. | |
| 7,527,027 | B2 * | 5/2009 | Fuwa et al. | 123/90.11 |
| 2004/0031466 | A1 | 2/2004 | Ogiso et al. | |
| 2004/0035391 | A1 | 2/2004 | Fuwa | |

(Continued)

FOREIGN PATENT DOCUMENTS

DE 42 34 117 A1 4/1993

(Continued)

OTHER PUBLICATIONS

Office Action issued in Japanese Application No. 2004-304770; mailed Dec. 15, 2009 (with translation).

*Primary Examiner* — Willis Wolfe, Jr.

(74) *Attorney, Agent, or Firm* — Oliff & Berridge, PLC

(57) ABSTRACT

An abnormality determination apparatus for an intake amount control mechanism according to the invention includes a control portion which sets an allowable range of an opening amount of a throttle valve which provided in an intake passageway of an internal combustion engine based at least on an index value of an engine operation state, including an operation amount of accelerator, and on a lift working angle of an intake valve, and which determines that an abnormality is present in a state of driving of the throttle valve if an actual opening amount of the throttle valve is outside the allowable range set.

5 Claims, 11 Drawing Sheets

U.S. PATENT DOCUMENTS

| | | | |
|---|---|---|---|
| 2004/0129249 | A1 | 7/2004 | Kondo |
| 2004/0187815 | A1 | 9/2004 | Hiraku et al. |

FOREIGN PATENT DOCUMENTS

| | | | |
|---|---|---|---|
| DE | 199 54 535 | A1 | 6/2001 |
| EP | 1 020 623 | A2 | 7/2000 |
| EP | 1 394 367 | A1 | 3/2004 |
| JP | A-5-99002 | | 4/1993 |
| JP | A-6-257494 | | 9/1994 |
| JP | A-7-12001 | | 1/1995 |
| JP | A-2001-263140 | | 9/2001 |
| JP | A-2004-138036 | | 5/2004 |

* cited by examiner

ABNORMALITY DETERMINATION APPARATUS FOR INTAKE AMOUNT CONTROL MECHANISM

This is a Division of application Ser. No. 11/244,044 filed Oct. 6, 2005, which claims the benefit Japanese Patent Application No. 2004-304770 filed on Oct. 19, 2004. The disclosures of the prior applications are hereby incorporated by reference herein in their entirety.

BACKGROUND OF THE INVENTION

1. Field of the Invention

The invention relates to an abnormality determination apparatus that is applied to an intake amount control mechanism of an internal combustion engine which includes a throttle valve and a changing mechanism capable of changing the lift working angle of an intake valve so as to make determination on the presence or absence of abnormality regarding the intake amount control mechanism.

2. Description of the Related Art

The adjustment of the amount of intake of an internal combustion engine is carried out through the adjustment of the opening amount of a throttle valve provided in an intake passageway. The throttle valve is driven and controlled so that the actual opening amount of the throttle valve becomes equal to a control target opening amount that is set on the basis of an index value regarding an engine operation state, such as the operation amount of accelerator, or the like.

Examples of known apparatuses for determining abnormality of an intake amount control mechanism as described above include an apparatus that determines that there is an abnormality in the throttle valve or its drive mechanism, on the condition that a state where the control target opening amount of the throttle valve and the actual opening amount thereof are apart from each other continues for a predetermined duration. Such related-art technologies are disclosed in, for example, Japanese Patent Application Laid-Open Publication No. JP-A-5-99002, or Japanese Patent Application Laid-Open Publication No. JP-A-7-12001.

A recently proposed mechanism for adjusting the amount of intake in an internal combustion engine is a technology in which, in addition to the mechanism for changing the state of the throttle valve, a mechanism for changing the duration from the opening of the intake valve till the closing thereof (lift working angle) in accordance with the engine operation state is provided. In such intake amount control mechanisms, it is difficult to simply set, for all conditions, a control target opening amount of the throttle valve on the basis of an index value of the engine operation state, for the following reasons.

A downstream portion of the intake passageway that extends from the throttle valve to an engine combustion chamber is provided with members that have large capacities, such as a surge tank, and the like. Therefore, in an internal combustion engine provided with the above-described intake amount control mechanism, the pressure in such a downstream portion changes in accordance with the lift working angle of the intake valve. The amount of intake air that passes through the throttle valve greatly varies depending on the pressure difference between the upstream side and the downstream side of the valve. Therefore, in order to set the aforementioned control target opening amount at a value that corresponds to the engine operation state, it is necessary to factor in the lift working angle of the intake valve as well, which causes changes in the pressure difference as mentioned above.

Taking this point into consideration, in an internal combustion engine provided with the above-described intake amount control mechanism, the control target opening amount of the throttle valve is ordinarily set at a value that corresponds to the then-occurring lift working angle. Therefore, in the case of related-art apparatuses that determine abnormality regarding the driving of the throttle valve provided that the state where the control target opening amount set on the basis of the amount of accelerator operation or the like, and the actual opening amount are apart from each other continues for a predetermined time, false determinations are inevitable depending on the situation regarding the lift working angle of the intake valve.

Furthermore, since the appropriate opening amount of the throttle valve or the appropriate lift working angle of the intake valve changes depending on the states of the opening amount and the lift working angle as described above, the determination on abnormality regarding the driving of the intake valve has a similar difficulty, that is, false determinations are inevitable depending on the opening amount of the throttle valve.

SUMMARY OF THE INVENTION

An abnormality determination apparatus for an intake amount control mechanism in accordance with a first aspect of the invention includes a control portion which sets an allowable range of an opening amount of a throttle valve which provided in an intake passageway of an internal combustion engine based at least on an index value of an engine operation state, including an operation amount of accelerator, and on a lift working angle of an intake valve, and which determines that an abnormality is present in a state of driving of the throttle valve if an actual opening amount of the throttle valve is outside the allowable range set.

According to the above-described constitution, the allowable range of the opening amount of the throttle valve to be set for the abnormality determination is set on the basis of an index value of the engine operation state and the lift working angle of the intake valve that is changed by a changing mechanism. Therefore, even in the case where the opening amount of the throttle valve greatly changes in accordance with the lift working angle of the intake valve, the abnormality determination can be executed in a manner that is appropriate for the case. Hence, it becomes possible to more accurately carry out the determination as to abnormality in the state of driving of the throttle valve.

An abnormality determination apparatus for an intake amount control mechanism in accordance with a second aspect includes an intake pressure detector device that detects an intake pressure in a portion of an intake passageway between an intake valve and a throttle valve provided in the intake passageway of an internal combustion engine, and a control portion which sets an allowable range of an opening amount of the throttle valve based at least on an index value of an engine operation state, including an operation amount of accelerator, and on the intake pressure detected, and which determines that an abnormality is present in a state of driving of the throttle valve if an actual opening amount of the throttle valve is outside the allowable range set.

The amount of intake air that passes through the throttle valve is determined by the differential pressure between the upstream side and the downstream side of the throttle valve, and the opening amount of the valve. Therefore, in the constitution in which the differential pressure is detected, it is possible to calculate, on the basis of the differential pressure, an opening amount of the throttle valve that satisfies requirements regarding the amount of intake that is determined in accordance with the index value of the engine operation state.

In this respect, according to the constitution of the second aspect, the allowable range of the opening amount of the throttle valve to be set for the abnormality determination is set on the basis of the intake pressure in the downstream portion, which is an index value of the aforementioned differential pressure, and an index value of the engine operation state. Therefore, it becomes possible to set, as the allowable range, a range that enables precise judgment regarding the occurrence of a case where an abnormality occurs in the state of driving of the throttle valve and therefore the actual amount of intake and the required value thereof become apart from each other. Hence, according to the above-described constitution, even in the case where the opening amount of the throttle valve greatly changes in accordance with the lift working angle of the intake valve, the abnormality determination can be executed in a manner that is appropriate for the case. Hence, it becomes possible to more accurately carry out the determination as to abnormality in the state of driving of the throttle valve. Furthermore, adoption of this constitution makes it possible to execute the abnormality determination in a manner that is in accordance with the intake pressure in the aforementioned downstream portion and therefore execute the determination with further improved precision.

An abnormality determination apparatus for an intake amount control mechanism in accordance with a third aspect includes an intake pressure detector device that detects an intake pressure in a portion of an intake passageway between an intake valve and a throttle valve provided in the intake passageway of an internal combustion engine, and a control portion which sets an allowable range of a lift working angle of the intake valve based at least on an index value of an engine operation state, including an operation amount of accelerator, and on the intake pressure detected, and which determines that an abnormality is present in a state of driving of the intake valve if the lift working angle is outside the allowable range set.

The amount of air taken from the intake passageway into the engine combustion chamber is determined by the intake pressure in a portion (the aforementioned downstream portion) of the intake passageway between the throttle valve and the intake valve, and the lift working angle of the intake valve. Therefore, in the constitution in which the intake pressure in the downstream portion is detected, a lift working angle of the intake valve that satisfies a required value of the amount of intake that is determined in accordance with the index value of the engine operation state can be calculated on the basis of the detected intake pressure.

In this respect, according to the constitution of the third aspect, the allowable range of the lift working angle of the intake valve to be set for the abnormality determination is set on the basis of the intake pressure in the aforementioned downstream portion, and an index value of the engine operation state. Therefore, it becomes possible to set, as the aforementioned allowable range, a range that enables precise judgment regarding the occurrence of a case where an abnormality occurs in the state of driving of the throttle valve and therefore the actual amount of intake and the required value thereof become apart from each other. Hence, according to the above-described constitution, even in the case where the opening amount of the throttle valve greatly changes in accordance with the lift working angle of the intake valve, the abnormality determination can be executed in a manner that is appropriate for the case. Therefore, it becomes possible to more accurately carry out the determination as to abnormality in the state of driving of the intake valve.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description, the invention will be described in more detail in terms of exemplary embodiments.

A first embodiment in which the abnormality determination apparatus for an intake amount control mechanism of the invention is embodied will be hereinafter described.

Figure 1:
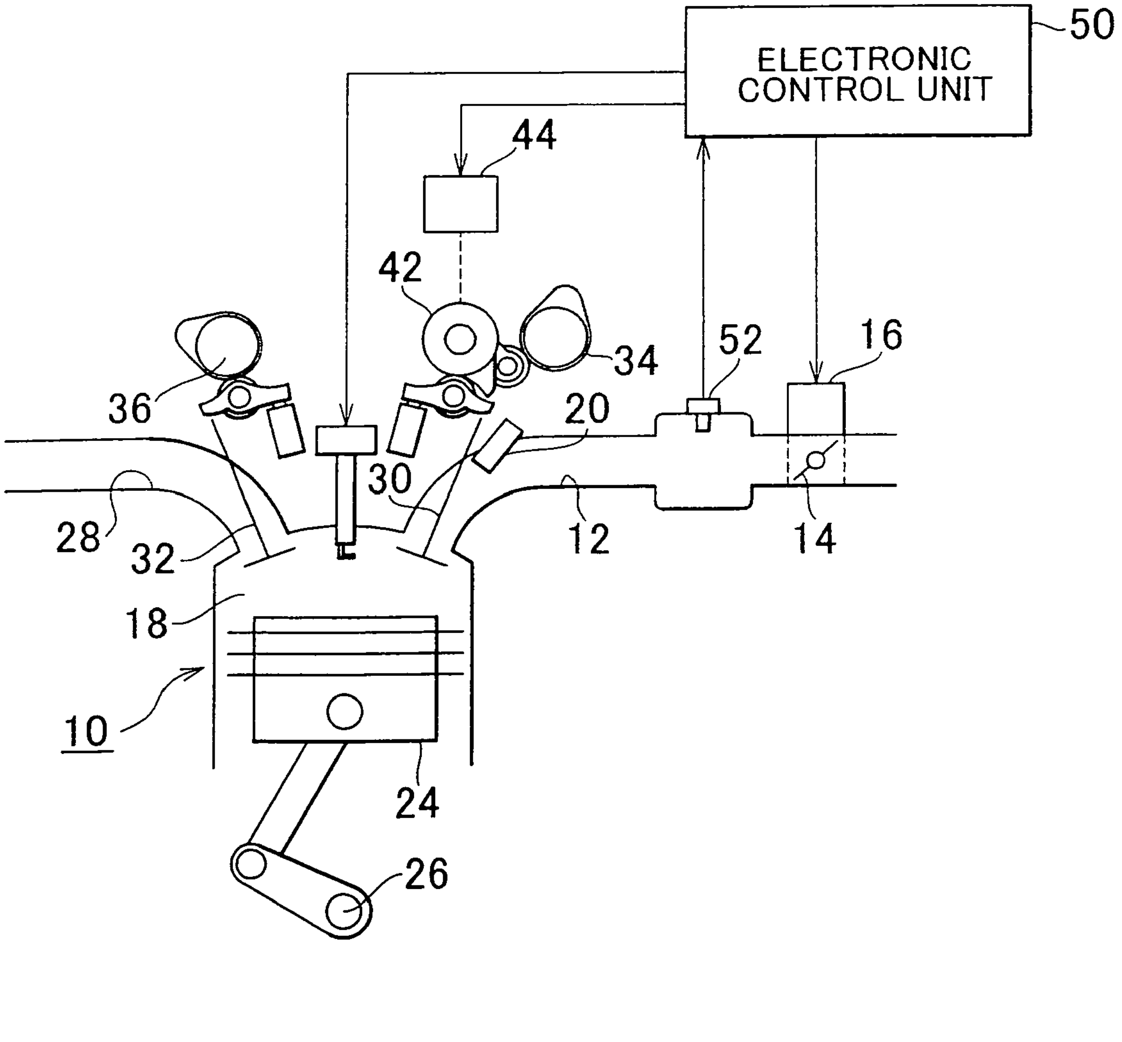
FIG. 1 is a schematic diagram illustrating an overall constitution of an internal combustion engine and its peripheral appliances to which a first embodiment of the invention is applied.

FIG. 1 shows an overall constitution of an internal combustion engine and its peripheral appliances to which an abnormality determination apparatus in accordance with this embodiment is applied. As shown in FIG. 1, an intake passageway 12 of an internal combustion engine 10 is provided with a throttle valve 14. A throttle motor 16 is connected to the throttle valve 14. Through the drive control of the throttle motor 16, the opening amount of the throttle valve 14 (throttle opening amount TA) is adjusted, so that the amount of air taken into a combustion chamber 18 through the intake passageway 12 is adjusted. Furthermore, the intake passageway 12 is provided with a fuel injection valve 20. This fuel injection valve 20 injects fuel into the intake passageway 12.

In the combustion chamber 18 of the internal combustion engine 10, a mixture formed by intake air and injected fuel is ignited. Due to this igniting operation, the mixture burns, so that a piston 24 reciprocates and therefore a crankshaft 26 rotates. The mixture after combustion is sent out, as exhaust gas, from the combustion chamber 18 into an exhaust passageway 28.

In the internal combustion engine 10, the intake passageway 12 and the combustion chamber 18 are connected to and disconnected from each other by the opening and closing actions of an intake valve 30, and the combustion chamber 18 and the exhaust passageway 28 are connected to and disconnected from each other by the opening and closing actions of an exhaust valve 32. The intake valve 30 is opened and closed due to rotation of an intake camshaft 34 to which rotation is transferred from a crankshaft 26. Likewise, the exhaust valve 32 is opened and closed due to rotation of an exhaust camshaft 36 to which rotation is transferred from the crankshaft 26.

Figure 2:
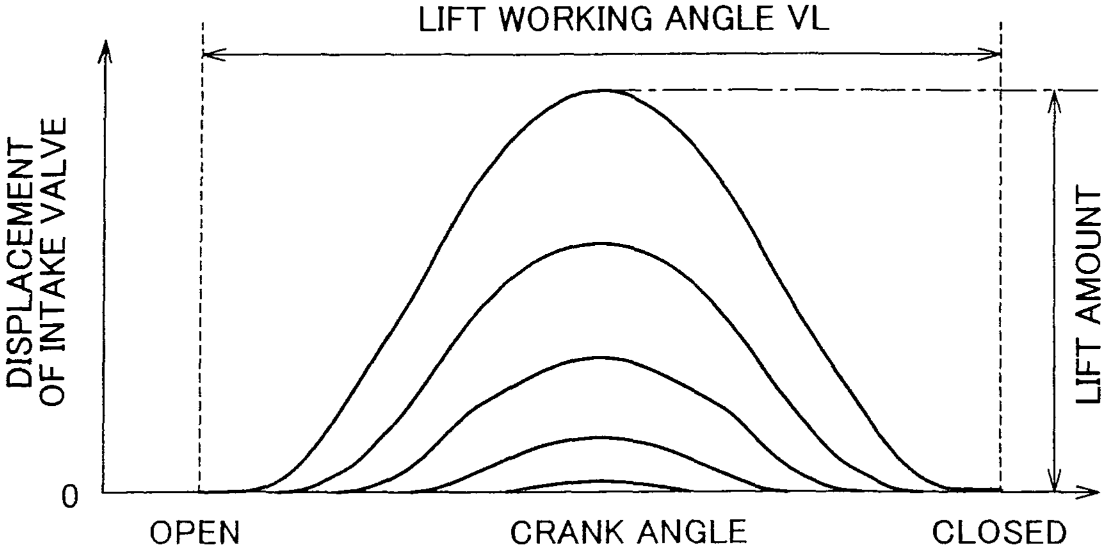
FIG. 2 is a graph indicating the manners of changes in the lift working angle of an intake valve based on the operation of an working-angle changing mechanism.

A working-angle changing mechanism 42 is provided between the intake camshaft 34 and the intake valve 30. This working-angle changing mechanism 42 variably sets the lift working angle VL of the intake valve 30 in accordance with the engine operation condition, and is operated through the drive control of an actuator 44 such as an electric motor or the like. As indicated in FIG. 2, due to the operation of the working-angle changing mechanism 42, the lift working angle VL of the intake valve 30 changes synchronously with the amount of lift (more specifically, the maximum amount of lift); for example, the amount of lift decreases as the lift working angle VL decreases.

The internal combustion engine 10 (FIG. 1) is provided with various sensors for detecting states of operation of the engine 10. Examples of such various sensors include a crank sensor for detecting the rotation speed of the crankshaft 26 (engine rotation speed) and the rotation angle (crank angle), and an accelerator sensor for detecting the amount of operation of an accelerator pedal (not shown) (operation amount of accelerator AC). Furthermore, a throttle sensor for detecting the throttle opening amount TA, an working-angle sensor for detecting the lift working angle VL of the intake valve 30 (more precisely, the amount of operation of the working-angle changing mechanism 42), an intake pressure sensor 52 for detecting the pressure (intake pressure PA) in a downstream side of the throttle valve 14 in the intake passageway 12, etc., are provided.

The internal combustion engine 10 is provided with an electronic control unit 50 that has, for example, a microcomputer. This electronic control unit 50 takes up detection signals from various sensors, and carries out various computations, and executes engine controls, such as a control of driving the throttle motor 16 (throttle control), a control of operating the working-angle changing mechanism 42, (lift-working-angle changing control), a control of driving the fuel injection valves 20 (fuel injection control), etc., on the basis of results of the various computations.

In this embodiment, the amount of intake is adjusted through the cooperation control of the throttle control and the lift-working-angle changing control, so that the actual amount of intake converges to the required value thereof (required amount of intake Tga).

Concretely, the aforementioned required amount of intake Tga is first calculated on the basis of the operation amount of accelerator AC. Then, on the basis of the required amount of intake Tga, a control target value (target working angle Tvl) for the lift working angle VL of the intake valve 30 is calculated. Then, the lift-working-angle changing control is executed so that the actual lift working angle VL and the target working angle Tvl become equal.

Besides this control, a control target opening amount (target throttle opening amount Tta) for the throttle opening amount TA is calculated on the basis of the lift working angle VL of the intake valve 30 and the aforementioned required amount of intake Tga. Then, the throttle control is executed so that the actual throttle opening amount TA and the target throttle opening amount Tta become equal.

Incidentally, the actual amount of intake becomes larger as the throttle opening amount TA becomes greater, or as the lift working angle VL of the intake valve 30 becomes greater. Therefore, in the above-described cooperation control, the amount of intake is adjusted to a desired amount by executing the throttle control and the working-angle changing control respectively so that the throttle opening amount TA is set relatively small when the lift working angle VL is great, and so that the throttle opening amount TA is set relatively large when the lift working angle VL is small, in a situation where the required amount of intake Tga is constant.

Furthermore, since the portion of the intake passageway 12 extending between the throttle valve 14 and the intake valve 30 (hereinafter, referred to as “downstream portion”) has a large capacity, a change made in the throttle opening amount TA is followed by a slight delay before the amount of air taken into the combustion chamber 18 changes to an amount that corresponds to the change made in the throttle opening amount TA. Therefore, in the cooperation control, values factoring in such a delay are calculated as the target throttle opening amount Tta and the target working angle Tvl.

Furthermore, during a transitional state immediately following a change made in the throttle opening amount TA or the lift working angle VL of the intake valve 30, the intake pressure in the downstream portion tends to change in various fashions depending on the then-occurring situation. Then, if the intake pressure in the downstream portion changes, the differential pressure between the upstream side and the downstream side of the throttle valve 14 changes, and therefore, the amount of intake air that passes through the throttle valve 14 also correspondingly changes. Therefore, during such a transitional state, the amount of intake varies depending on the situation regarding the intake pressure in the downstream-side portion, even if the throttle opening amount TA and the lift working angle VL of the intake valve 30 are respectively set at fixed values. In this respect, in the cooperation control under such a transitional situation, the throttle control and the working angle changing control are executed so that a target throttle opening amount Tta and a target working angle Tvl that are suitable for the then-occurring situation are calculated, and the actual amount of intake converges to the required amount of intake Tga.

In this embodiment, a determination process for determining whether there is an abnormality in the intake amount control mechanism for adjusting the amount of intake, such as the throttle valve 14, the throttle motor 16, the working-angle changing mechanism 42, etc., is executed.

The determination process will be concretely described hereinafter with reference to the flowchart of FIG. 3. A series of processes shown in this flowchart represents a concrete processing procedure of the determination process, and is executed as a process repeated in every predetermined period by the electronic control unit 50.

Figure 3:
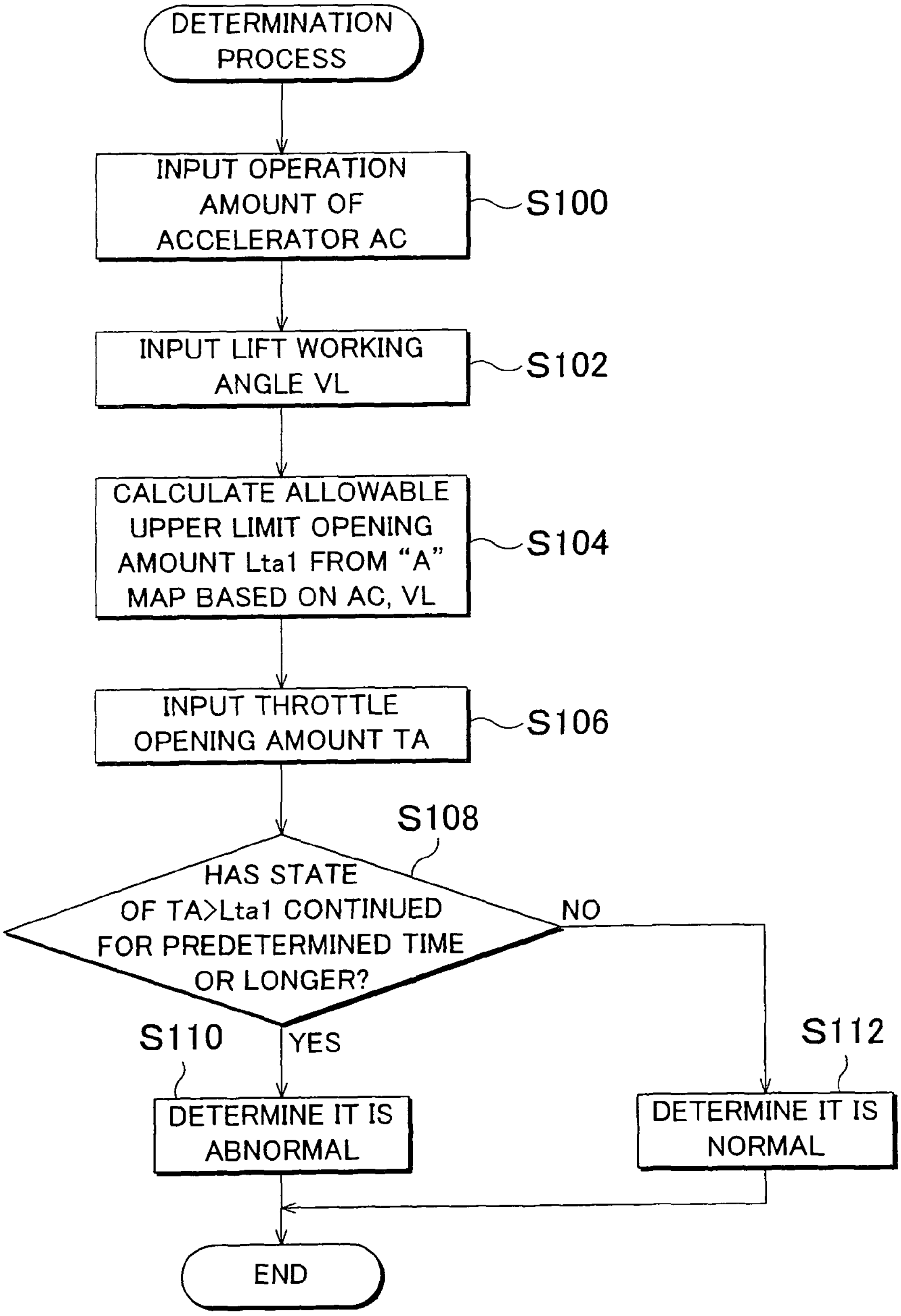
FIG. 3 is a flowchart illustrating a concrete processing procedure of a determination process in accordance with a first embodiment.

First in this process, the operation amount of accelerator AC and the lift working angle VL of the intake valve 30 are input (steps S100 and S102) as shown in FIG. 3. Then, on the basis of the operation amount of accelerator AC and the lift working angle VL, an allowable upper limit opening amount Lta1 for the throttle opening amount TA is calculated from an “A” map (step S104). In this embodiment, the process of step S104 functions as a setting means for setting an allowable range of the opening amount of the throttle valve.

The "A" map is a map for calculating the allowable upper limit opening amount Lta1 on the basis of the operation amount of accelerator AC and the lift working angle VL. A relationship between the engine operation state determined from the operation amount of accelerator AC and the lift working angle VL, and the allowable upper limit opening amount Lta1 suitable for the engine operation state has been determined through various experiments and the like, and has been set in the map.

Figure 4:
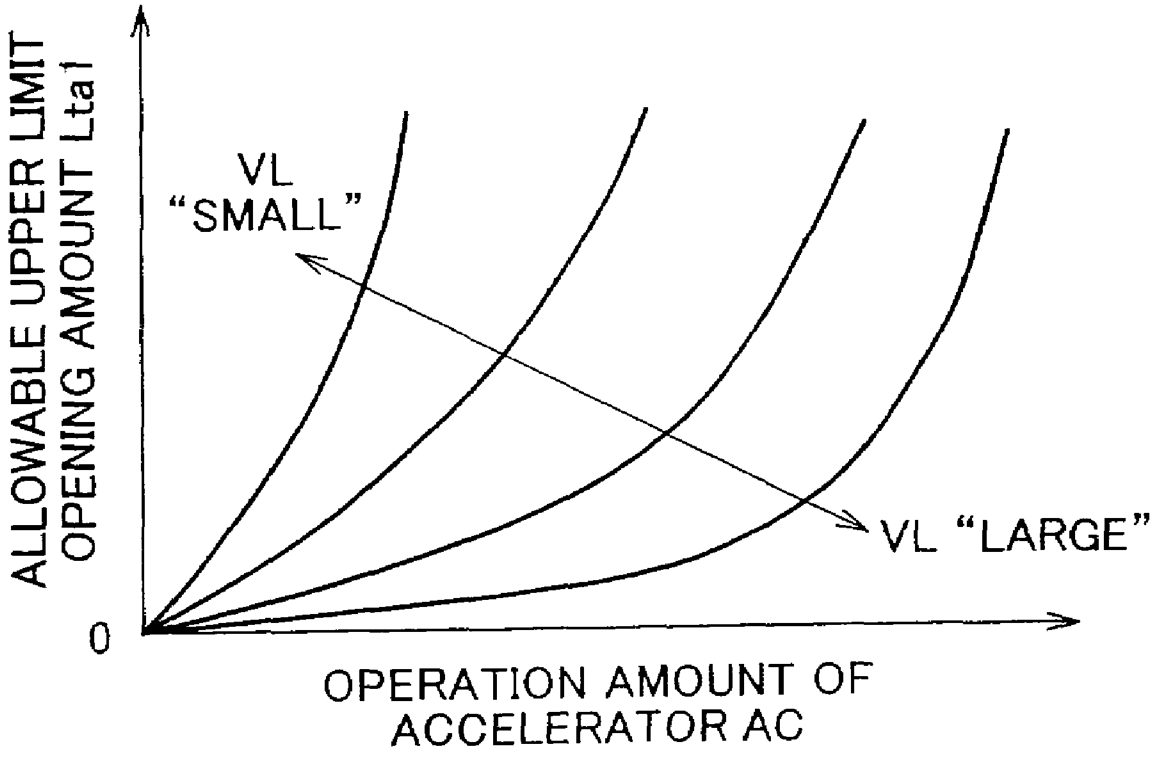
FIG. 4 is a schematic diagram conceptually illustrating the map structure of an “A” map that is used for calculating an allowable upper limit opening amount.

As indicated in FIG. 4, the allowable upper limit opening amount Lta1 calculated from the "A" map becomes greater as the operation amount of accelerator AC becomes greater, or as the lift working angle VL of the intake valve 30 becomes smaller. This is based on the following reasons. That is, in the cooperation control in accordance with this embodiment, the throttle control is executed so that the throttle opening amount TA becomes greater as the operation amount of accelerator AC becomes greater, or as, under the condition that the amount of intake is constant, the lift working angle VL of the intake valve 30 becomes smaller.

After that, the throttle opening amount TA is input (step S106), and it is judged whether a state (abnormal state) where the throttle opening amount TA is greater than the allowable upper limit opening amount Lta1 has continued for a predetermined time or longer (step S108).

If the abnormal state has continued for the predetermined time or longer (YES at step S108), it is considered that an abnormality has occurred in the state of driving of the throttle valve 14, and it is determined that the intake amount control mechanism is abnormal (step S110). In this embodiment, the processes of steps S108 and S110 function as a determination means for determining that there is an abnormality in the state of driving of the throttle valve.

Conversely, if the abnormal state is not occurring or the duration of the abnormal state is less than the predetermined time (NO at step S108), it is considered that abnormality is not occurring in the state of driving of the throttle valve 14 or that the abnormal state has not continued long enough to allow accurate determination of occurrence of abnormality. Thus, it is determined that the intake amount control mechanism is normal (step S112).

After determination is made as to the presence or absence of abnormality in the intake amount control, the process temporarily ends.

As described above, this embodiment achieves the following advantages:

(1) The allowable upper limit opening amount Lta1 is set on the basis of the operation amount of accelerator AC and the lift working angle VL of the intake valve 30. Therefore, in the intake amount control mechanism of this embodiment in which the throttle opening amount TA greatly changes in accordance with the lift working angle VL, the abnormality determination can be executed in a manner that is appropriate for the change in the throttle opening amount TA. Therefore, it becomes possible to accurately carry out the determination as to abnormality in the state of driving of the throttle valve 14 and therefore abnormality in the intake amount control mechanism.

(2) Provided that the state where the throttle opening amount TA is greater than the allowable upper limit opening amount Lta1 has continued for a predetermined time or longer, it is determined that the intake amount control mechanism is abnormal. This makes it possible to avoid an accidental false determination, for example, a determination of abnormality made on the basis of an event that the throttle opening amount TA temporarily becomes greater than the allowable upper limit opening amount Lta1 for some factor even though the state of driving of the throttle valve 14 is a state that can be said to be normal. Furthermore, it becomes possible to carry out the determination on abnormality regarding the state of driving of the throttle valve 14 with an increased certainty.

(3) For the sake of the abnormality determination, the allowable upper limit opening amount Lta1 for the throttle opening amount TA is set. Therefore, it becomes possible to accurately determine whether an abnormality where the throttle opening amount TA becomes greater than the allowable upper limit opening amount Lta1, that is, among the abnormalities in the driving of the throttle valve 14, an abnormality that causes the engine power to be greater than necessary, has occurred.

A second embodiment in which the abnormality determination apparatus for an intake amount control mechanism of the invention is embodied will be hereinafter described.

This embodiment and the first embodiment are different in the following respects. In the first embodiment, the allowable upper limit opening amount Lta1 for the throttle opening amount TA is set on the basis of the operation amount of accelerator AC and the lift working angle VL of the intake valve 30. On the other hand, the abnormality determination apparatus of the second embodiment adopts, as a calculation parameter for use for calculating the allowable upper limit opening amount Lta2, an intake pressure PA detected by the aforementioned intake pressure sensor 52, in addition to the operation amount of accelerator AC and the lift working angle VL of the intake valve 30.

Incidentally, the overall constitution of an internal combustion engine and its peripheral appliances to which the abnormality determination apparatus of this embodiment is applied is substantially the same as the constitution of the internal combustion engine 10 and its peripheral appliances shown in FIG. 1, and detailed description thereof will be omitted below. Furthermore, as for the engine controls in this embodiment, the aforementioned throttle control, the working-angle changing control, and the fuel injection control are also executed. The control manners of these controls are assumed to be substantially the same as those in the first embodiment, and detailed description thereof will be also omitted below.

As described above, in a transitional situation immediately after the throttle opening amount TA or the lift working angle VL of the intake valve 30 is changed, a target throttle opening amount Tta and a target working angle Tvl suitable for the then-occurring situation are calculated, and the throttle control and the working-angle changing control are executed so that the actual amount of intake converges to the required amount of intake Tga. Therefore, the amount of intake is properly adjusted.

However, during such a transitional state, the throttle opening amount TA varies depending on the situation of the intake pressure in the downstream portion (the portion of the intake passageway 12 extending between the throttle valve 14 and the intake valve 30) even if the operation amount of accelerator AC and the lift working angle VL of the intake valve 30 are fixed values. Therefore, if the allowable upper limit opening amount Lta1 is calculated on the basis of the operation amount of accelerator AC and the lift working angle VL of the intake valve 30 as in the above-described determination process (FIG. 3) according to the first embodiment, it is desirable to set the allowable upper limit opening amount Lta1 at a great opening amount that includes a margin for the change in the throttle opening amount TA caused by the influence of the intake pressure. However, this is a factor that impedes further improvement of the precision in the determination.

Taking this point into consideration, this embodiment performs the determination process as follows. The intake pressure in the downstream portion, specifically, the intake pressure PA detected by the intake pressure sensor 52, is added as a calculation parameter, so as to calculate an allowable upper limit opening amount Lta2. On the basis of the allowable upper limit opening amount Lta2, it is determined whether there is abnormality in the intake amount control mechanism.

The determination process in this embodiment will be concretely described hereinafter with reference to the flowchart of FIG. 5. A series of processes shown in this flowchart represents a concrete processing procedure of the determination process, and is executed as a process repeated in every predetermined period by the electronic control unit 50.

Figure 5:
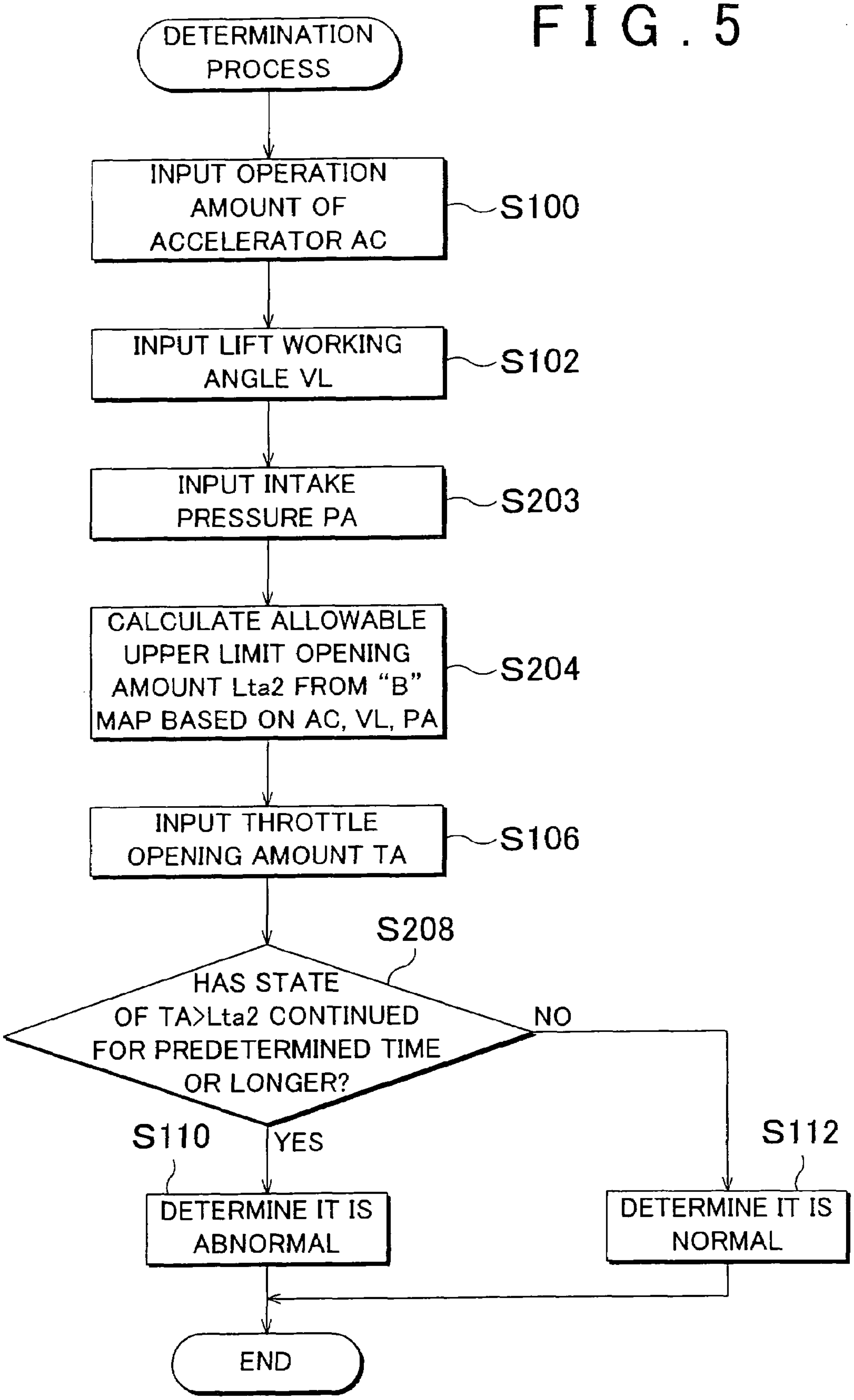
FIG. 5 is a flowchart illustrating a concrete processing procedure of a determination process in accordance with a second embodiment of the invention.

First in this process, the operation amount of accelerator AC and the lift working angle VL of the intake valve 30 are input (steps S100 and S102) as shown in FIG. 5. Then, the intake pressure PA is also input (step S203).

Then, on the basis of the operation amount of accelerator AC, the lift working angle VL and the intake pressure PA, an allowable upper limit opening amount Lta2 for the throttle opening amount TA is calculated from a "B" map (step S204).

The "B" map is a map for calculating the allowable upper limit opening amount Lta2 on the basis of the operation amount of accelerator AC, the lift working angle VL and the intake pressure PA. A relationship between the engine operation state determined from the operation amount of accelerator AC, the lift working angle VL and the intake pressure PA, and the allowable upper limit opening amount Lta2 suitable for the engine operation state has been determined through various experiments, and has been set in the map.

Furthermore, the allowable upper limit opening amount Lta2 calculated from the "B" map becomes greater as the operation amount of accelerator AC becomes greater, or as the lift working angle VL of the intake valve 30 becomes smaller, or as the intake pressure PA becomes higher. The reason for calculating the allowable upper limit opening amount Lta2 in this manner is that in the cooperation control in this embodiment, the throttle control is executed as follows:

(a) The throttle opening amount TA is controlled to a greater opening amount as the operation amount of accelerator AC becomes greater.

(b) Under the condition that the required amount of intake Tga and the intake pressure PA are constant, the throttle opening amount TA is controlled to a greater opening amount as the lift working angle VL of the intake valve 30 becomes smaller.

(c) Under the condition that the required amount of intake Tga and the lift working angle VL of the intake valve 30 are constant, the throttle opening amount TA is controlled to a greater opening amount as the intake pressure PA becomes higher.

After that, the throttle opening amount TA is input (step S106), and it is judged whether a state (abnormal state) where the throttle opening amount TA is greater than the allowable upper limit opening amount Lta2 has continued for a predetermined time or longer (step S208).

If the abnormal state has continued for the predetermined time or longer (YES at step S208), it is determined that the intake amount control mechanism is abnormal (step S110). Conversely, if the abnormal state is not occurring or the duration of the abnormal state is less than the predetermined time (NO at step S208), it is determined that the intake amount control mechanism is normal (step S112).

After determination is made as to the presence or absence of abnormality in the intake amount control mechanism as described above, the process temporarily ends.

It is to be noted herein that the actual amount of intake can be determined with relatively high precision from the throttle opening amount TA, the lift working angle VL of the intake valve 30, and the intake pressure PA. Therefore, it can be said that, in a situation where the actual amount of intake has substantially converged to the required amount of intake Tga, that is, in a situation where the intake amount control mechanism is normally functioning, the throttle opening amount TA can be determined from the required amount of intake Tga, the lift working angle VL of the intake valve 30, and the intake pressure PA.

In this respect, the embodiment performs the determination process as follows. The allowable upper limit opening amount Lta2 for the throttle opening amount TA is set on the basis of the operation amount of accelerator AC, the lift working angle VL, and the intake pressure PA which are calculation parameters for the required amount of intake Tga, so that the set opening amount Lta2 is appropriate for the relationship among them. Therefore, the determination as to abnormality of the intake amount control mechanism can be executed with improved precision.

As described above, this embodiment achieves the following embodiments, in addition to the advantages as stated in the foregoing paragraphs (1) to (3).

(4) Since the allowable upper limit opening amount Lta2 for the abnormality determination is set on the basis of the operation amount of accelerator AC, the lift working angle VL of the intake valve 30, and the intake pressure PA, it becomes possible to execute the determination as to abnormality of the intake amount control mechanism with improved precision.

(5) As the allowable upper limit opening amount Lta2 of the throttle valve 14, greater opening amount are set for higher intake pressures PA. Therefore, under the condition that the required amount of intake Tga and the lift working angle VL of the intake valve 30 are constant, the throttle opening amount TA is set greater for higher intake pressures PA. Thus, the allowable upper limit opening amount Lta2 can be set in such a manner that is appropriate for the relationship between the intake pressure PA and the throttle opening amount TA, so that more accurate abnormality determination can be carried out.

A third embodiment in which the abnormality determination apparatus for an intake amount control mechanism of the invention is embodied will be hereinafter described.

This embodiment and the first embodiment are different in the following respects. In the first embodiment, the allowable upper limit opening amount Lta1 for the throttle opening amount TA is set on the basis of the operation amount of accelerator AC and the lift working angle VL of the intake valve 30. In the third embodiment, on the other hand, an allowable upper limit opening amount Lta3 for the throttle opening amount TA is set on the basis of the operation amount of accelerator AC, and the intake pressure PA detected by the intake pressure sensor 52.

Incidentally, the overall constitution of an internal combustion engine and its peripheral appliances to which the abnormality determination apparatus of this embodiment is applied is substantially the same as the constitution of the internal combustion engine 10 and its peripheral appliances shown in FIG. 1, and detailed description thereof will be omitted below. Furthermore, as for the engine controls in this embodiment, the aforementioned throttle control, the working-angle changing control, and the fuel injection control are also executed. The control manners of these controls are assumed to be substantially the same as those in the first embodiment, and detailed description thereof will be also omitted below.

The amount of intake air that passes through the throttle valve 14 in the intake passageway 12 is determined by the differential pressure between the upstream and downstream sides of the throttle valve 14, and the throttle opening amount TA. Therefore, from the differential pressure and the aforementioned required amount of intake Tga, the throttle opening amount TA that causes the actual amount of intake to be equal to the required amount of intake Tga can be determined with good precision.

Taking into consideration the relationship among the differential pressure, the required amount of intake Tga and the throttle opening amount TA, this embodiment performs the determination process as follows. An allowable upper limit opening amount Lta3 for the throttle opening amount TA is set on the basis of the intake pressure PA detected by the intake pressure sensor 52, which is an index value of the differential pressure, and the operation amount of accelerator AC, which is a calculation parameter for the required amount of intake Tga.

Therefore, it becomes possible to set, as the allowable upper limit opening amount Lta3, an opening amount that enables precise judgment regarding the occurrence of a case where an abnormality occurs in the intake amount control mechanism and therefore the actual amount of intake becomes greater than the required amount of intake Tga by a predetermined amount or greater. Through the comparison of the throttle opening amount TA with the allowable upper limit opening amount Lta3, abnormality of intake amount control mechanism can be determined with good precision.

A determination process in this embodiment will be described hereinafter with reference to the flowchart of FIG. 6. A series of processes shown in this flowchart represents a concrete processing procedure of the determination process, and is executed as a process repeated in every predetermined period by the electronic control unit 50.

Figure 6:
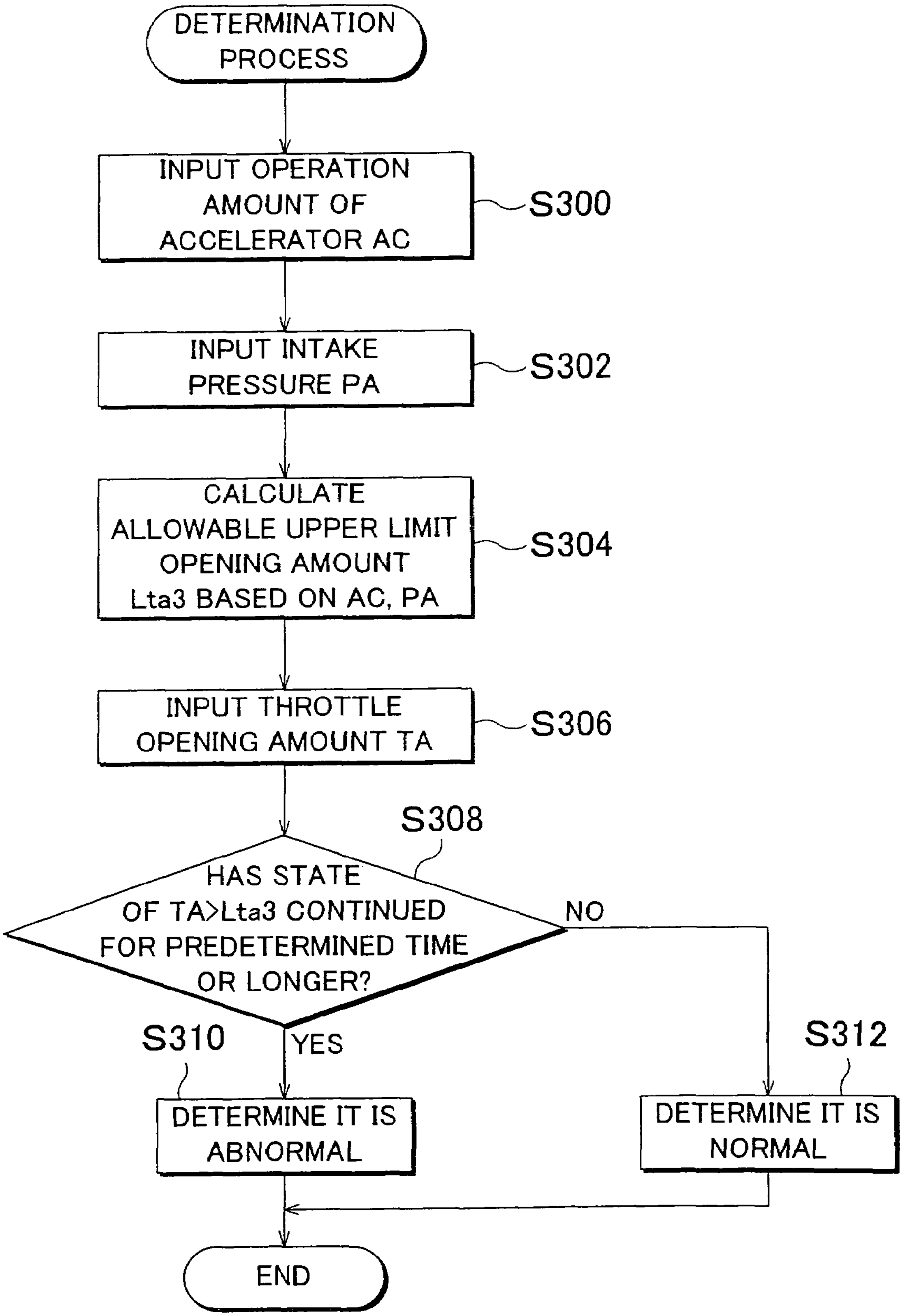
FIG. 6 is a flowchart illustrating a concrete processing procedure of a determination process in accordance with a third embodiment.

First in this process, the operation amount of accelerator AC and the intake pressure PA are input (steps S300 and S302) as shown in FIG. 6. Then, an allowable upper limit opening amount Lta3 is calculated on the basis of the operation amount of accelerator AC and the intake pressure PA (step S304). In this embodiment, the process of step S304 functions as a setting means for setting an allowable range of the opening amount of the throttle valve.

Figure 7:
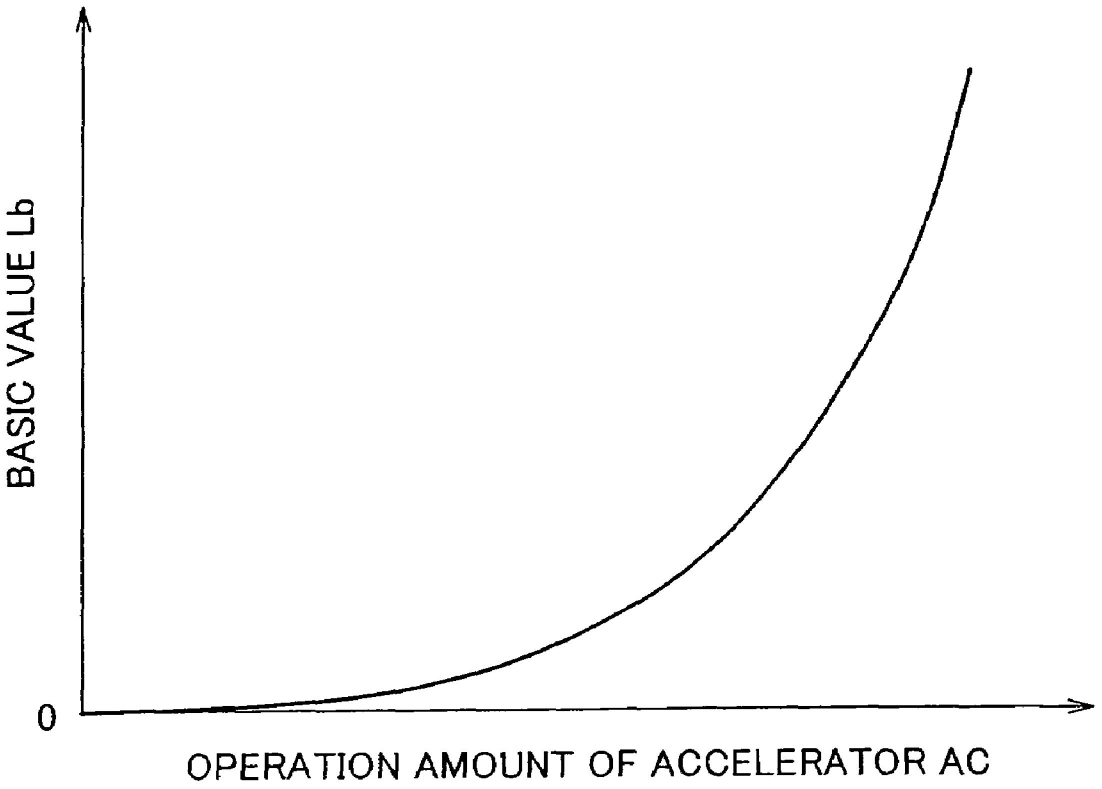
FIG. 7 is a schematic diagram conceptually illustrating the map structure of a “C” map that is used for calculating a basic value.

In this stage, a basic value Lb for the allowable upper limit opening amount Lta3 is calculated from a "C" map on the basis of the operation amount of accelerator AC. Calculated as the basic value Lb is a value that corresponds to the allowable upper limit opening amount Lta3 that is suitable for the operation amount of accelerator AC occurring in a situation where the lift working angle VL of the intake valve 30 is controlled to a maximum angle. Concretely, as indicated in a conceptual illustration of the structure of the "C" map in FIG. 7, a value that corresponds to a progressively greater opening amount is calculated as the operation amount of accelerator AC becomes greater. A relationship between the basic value Lb and the operation amount of accelerator AC has been determined through various experiments and the like, and has been set in the "C" map.

Besides the calculation of the basic value Lb in the above-described manner, a correction factor Kp is calculated. The correction factor Kp is a factor for calculating the allowable upper limit opening amount Lta3 by multiplying the basic value Lb by the factor shown in expression (1). Concretely, the correction factor Kp is calculated from a "D" map on the basis of the intake pressure PA.

$$Lta3 \leftarrow Lb \cdot Kp: \qquad \text{Expression (1)}$$

It is to be noted herein that the amount of intake air that passes through the throttle valve 14 basically becomes larger for greater differential pressures between the upstream and downstream sides of the throttle valve 14. However, in the case where the intake pressure on the downstream side of the throttle valve 14 is reduced under the condition that the throttle opening amount TA is constant, the amount of intake air that passes through the throttle valve 14 stops increasing if the pressure ratio between the upstream and downstream sides (downstream side pressure/upstream side pressure) becomes less than a predetermined pressure ratio, that is, a generally termed critical pressure ratio. Incidentally, the critical pressure ratio is a pressure ratio at which the flow velocity of the intake air that passes through the throttle valve 14 reaches the velocity of sound.

Figure 8:
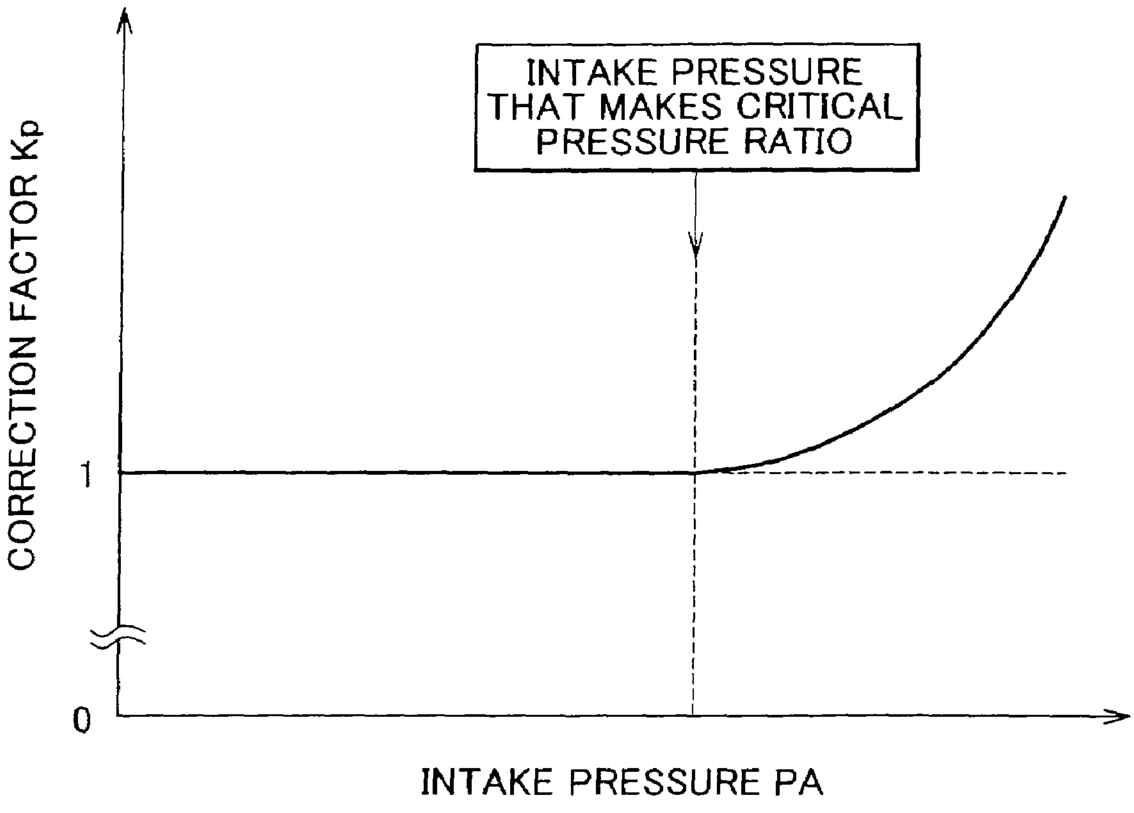
FIG. 8 is a schematic diagram conceptually illustrating the map structure of a “D” map that is used for calculating a correction factor.

Taking this point into consideration, "1.0" is calculated as a correction factor Kp in a region where the pressure ratio is equal to or less than the critical pressure ratio, as indicated in a conceptual illustration of the structure of the "D" map in FIG. 8. Therefore, through the relational expression (1), the basic value Lb is calculated as an allowable upper limit opening amount Lta3. A reason for setting the correction factor Kp in this manner is that the actual amount of intake within the aforementioned region is not dependent on the differential pressure between the upstream and downstream sides of the throttle valve 14, but is determined solely by the throttle opening amount TA.

On the other hand, in a region where the pressure ratio is higher than the critical pressure ratio, a positive number of "1.0" or greater is calculated as the correction factor Kp in such a manner that the calculated positive number becomes greater as the differential pressure becomes lower, specifically, as the intake pressure PA, which is an index value of the differential pressure, becomes higher. Therefore, in the aforementioned region, as the intake pressure PA becomes higher, a greater opening amount is calculated as the allowable upper limit opening amount Lta3 through the forgoing relational expression (1). A reason for setting the correction factor Kp in the above-described manner is that in order to make the actual amount of intake equal to the required amount of intake Tga in a situation where the required amount of intake Tga is fixed, it is necessary to set the throttle opening amount TA greater for higher intake pressures PA.

After the basic value Lb and the correction factor Kp are calculated in the above-described manner, the allowable upper limit opening amount Lta3 is calculated through the relational expression (1). After that, the throttle opening amount TA is input (step S306), and it is judged whether a state (abnormal state) where the throttle opening amount TA is greater than the allowable upper limit opening amount Lta3 has continued for a predetermined time or longer (step S308).

If the abnormal state has continued for the predetermined or longer (YES at step S308), it is determined that the intake amount control mechanism is abnormal (step S310). If the abnormal state is not occurring or the duration of the abnormal state is less than the predetermined time (NO at step S308), it is determined that the intake amount control mechanism is normal (step S312).

After determination is made as to the presence or absence of abnormality in the intake amount control mechanism in the above-described manner, the process temporarily ends.

As described above, this embodiment achieves the following advantages:

(1) The allowable upper limit opening amount Lta3 for the throttle opening amount TA is set on the basis of the operation amount of accelerator AC and the intake pressure PA. If the throttle opening amount TA becomes greater than the allowable upper limit opening amount Lta3, it is determined that the intake amount control mechanism is abnormal. Therefore, it becomes possible to set, as the allowable upper limit opening amount Lta3, a value that enables precise judgment regarding the occurrence of a case where an abnormality occurs in the intake amount control mechanism and therefore the actual amount of intake becomes greater than the required amount of intake Tga by a predetermined amount or greater. Furthermore, on the basis of the event that the throttle opening amount TA has become greater than the allowable upper limit opening amount Lta3, it can be determined with good precision that the actual amount of intake has become greater than the required amount of intake Tga by a predetermined amount or greater. Therefore, even in the case where the throttle opening amount TA greatly changes in accordance with the lift working angle VL of the intake valve 30, the abnormality determination can be carried out in a manner that is appropriate for the case. Hence, it becomes possible to accurately carry out the determination as to abnormality in the state of driving of the throttle valve 14, that is, abnormality of the intake amount control mechanism.

(2) Advantages similar to those stated in the paragraphs (2) and (3) in conjunction with the first embodiment can be achieved.

(3) As the allowable upper limit opening amount Lta3, greater opening amount are set for higher intake pressures PA. Therefore, under the condition that the required amount of intake Tga is fixed, the throttle opening amount TA is set greater for higher intake pressures PA. In this manner, the allowable upper limit opening amount Lta3 can be set in a manner that is appropriate for the relationship between the intake pressure PA and the throttle opening amount TA, and accurate abnormality determination can be carried out.

A fourth embodiment in which the abnormality determination apparatus for an intake amount control mechanism of the invention is embodied will be hereinafter described.

This embodiment and the first embodiment are different in the following respects. In the first embodiment, the allowable upper limit opening amount Lta1 for the throttle opening amount TA is set and, by comparing the throttle opening amount TA with the allowable upper limit opening amount Lta1, determination is made as to abnormality of the intake amount control mechanism. In the abnormality determination apparatus of the fourth embodiment, on the other hand, an allowable upper limit angle Lvl for the lift working angle VL of the intake valve 30 is set and, by comparing the lift working angle VL with the allowable upper limit angle Lvl, determination is made as to abnormality of the intake amount control mechanism.

Incidentally, the overall constitution of an internal combustion engine and its peripheral appliances to which the abnormality determination apparatus of this embodiment is applied is substantially the same as the constitution of the internal combustion engine 10 and its peripheral appliances shown in FIG. 1, and detailed description thereof will be omitted below. Furthermore, as for the engine controls in this embodiment, the aforementioned throttle control, the working-angle changing control, and the fuel injection control are also executed. The control manners of these controls are assumed to be substantially the same as those in the first embodiment, and detailed description thereof will be also omitted below.

The amount of air taken into the combustion chamber 18 through the intake passageway 12 of the internal combustion engine 10 is determined by the intake pressure in a portion (the aforementioned downstream portion) of the intake passageway 12 between the throttle valve 14 and the intake valve 30, and by the lift working angle VL of the intake valve 30.

Therefore, from the intake pressure in the downstream portion, that is, the intake pressure PA detected by the intake pressure sensor 52 as well as the required amount of intake Tga, the lift working angle VL of the intake valve 30 that makes the actual amount of intake equal to the required amount of intake Tga can be determined with good precision.

Taking into consideration the relationship among the intake pressure PA, the required amount of intake Tga and the lift working angle VL, this embodiment performs a determination process as follows. The allowable upper limit angle Lvl for the lift working angle VL is set on the basis of the intake pressure PA, and the operation amount of accelerator AC, which is a calculation parameter for the required amount of intake Tga.

Therefore, as the allowable upper limit angle Lvl, a value is set which enables precise judgment regarding the occurrence of a case where an abnormality occurs in the intake amount control mechanism and therefore the actual amount of intake becomes greater than the required amount of intake Tga by a predetermined amount or greater. Through the comparison of the lift working angle VL with the allowable upper limit angle Lvl, abnormality of intake amount control mechanism can be determined with good precision.

A determination process in this embodiment will be described hereinafter with reference to the flowchart of FIG. 9. A series of processes shown in this flowchart represents a concrete processing procedure of the determination process, and is executed as a process repeated in every predetermined period by the electronic control unit 50.

Figure 9:
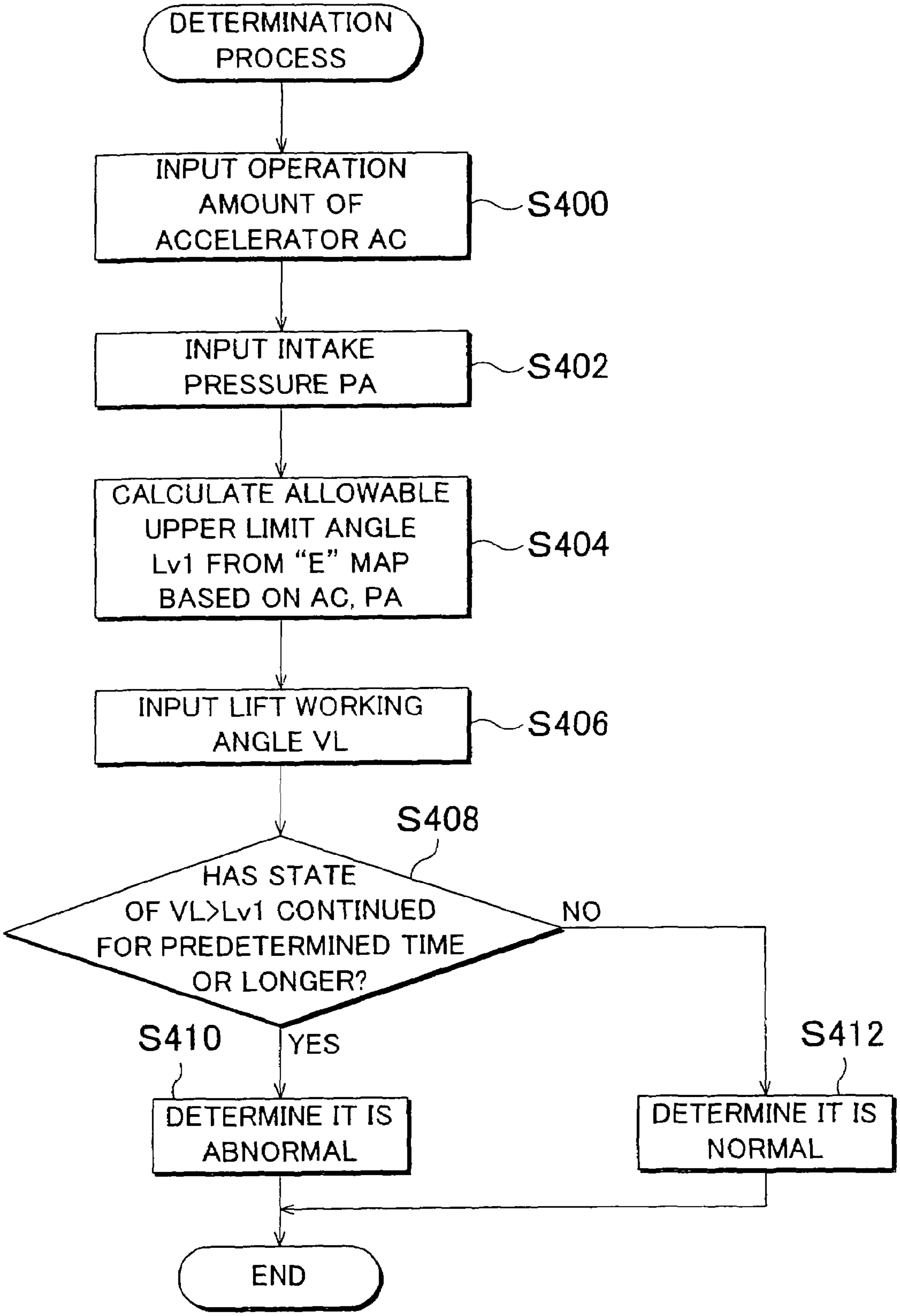
FIG. 9 is a flowchart illustrating a concrete processing procedure of a determination process in accordance with a fourth embodiment.

First in this process, the operation amount of accelerator AC and the intake pressure PA are input (steps S400 and S402) as shown in FIG. 9. Then, on the basis of the operation amount of accelerator AC and the intake pressure PA, an allowable upper limit angle Lvl is calculated from an "E" map (step S404). In this embodiment, the process of step S404 functions as a setting means for setting an allowable range of the lift working angle of the intake valve.

Incidentally, the "E" map is a map for calculating the allowable upper limit angle Lvl on the basis of the operation amount of accelerator AC and the intake pressure PA. A relationship between the engine operation state determined from the operation amount of accelerator AC and the lift working angle VL, and the allowable upper limit angle Lvl suitable for the engine operation state has been determined through various experiments and the like, and has been set in the map.

Figure 10:
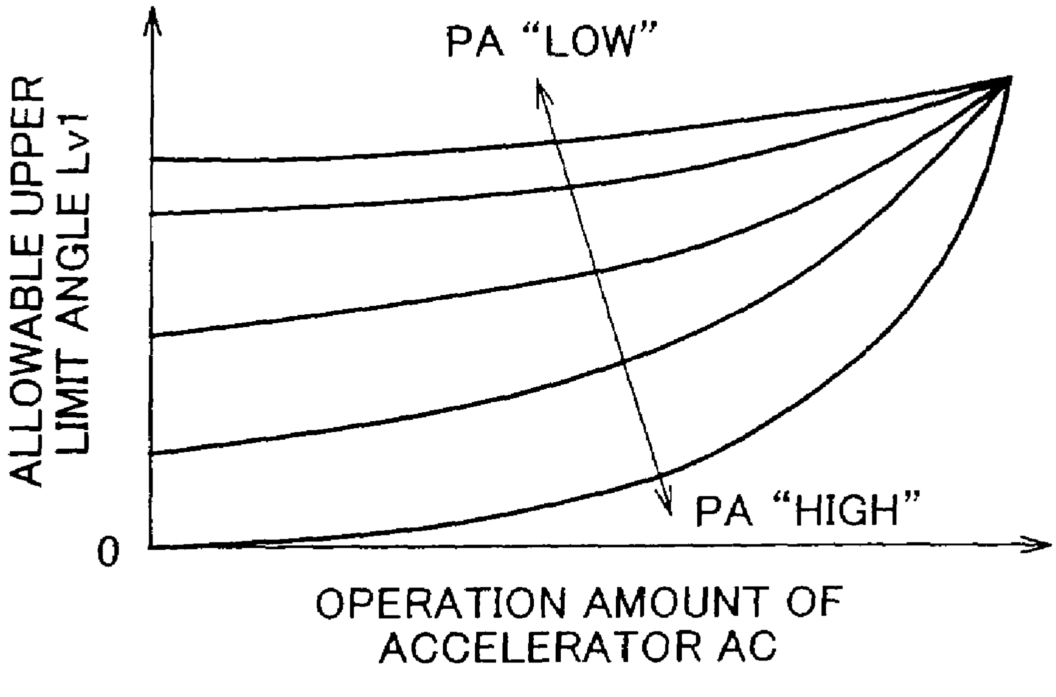
FIG. 10 is a schematic diagram conceptually illustrating the map structure of an “E” map that is used for calculating an allowable upper limit angle.
Figure 11:
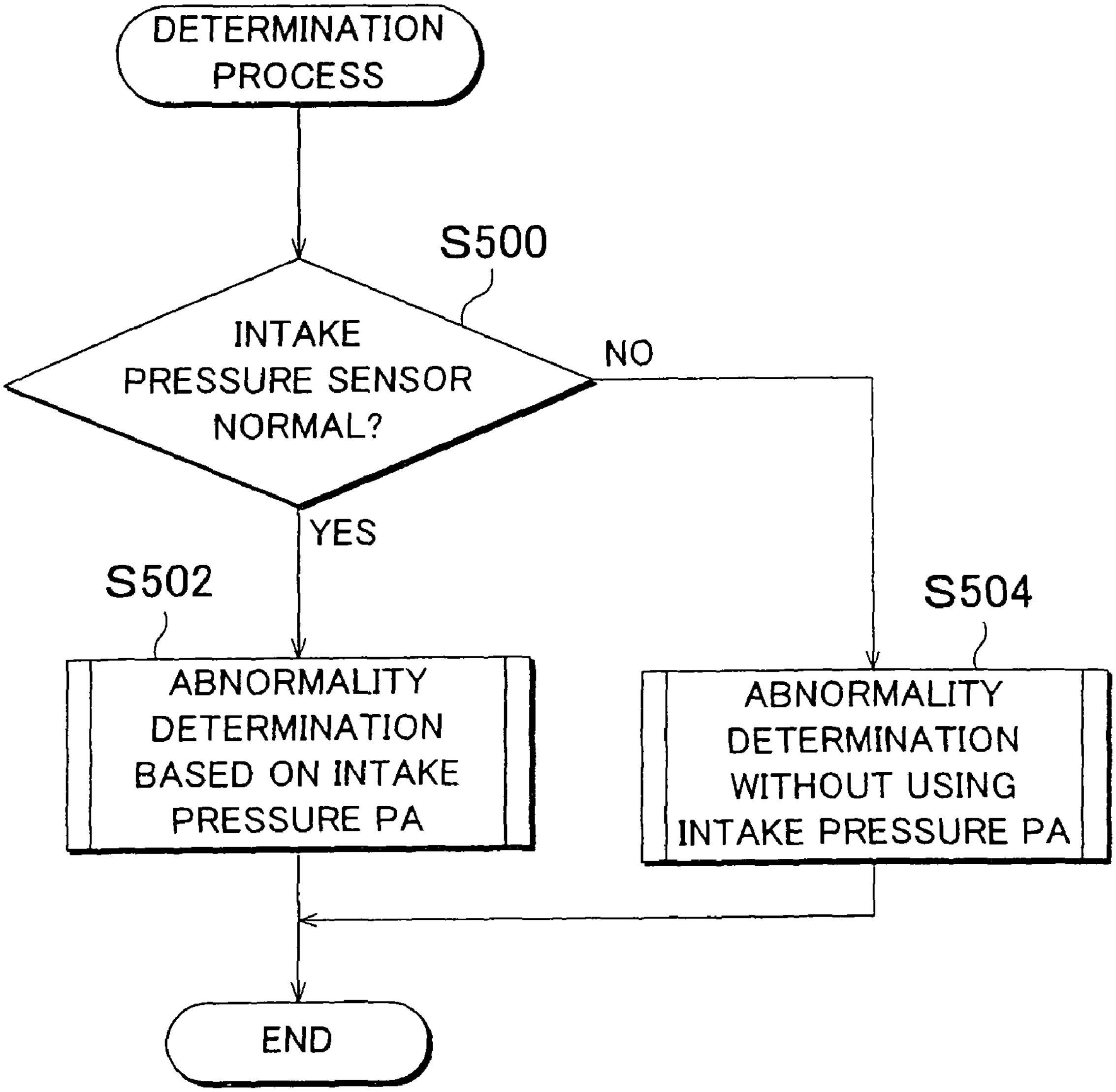
FIG. 11 is a flowchart illustrating a concrete processing procedure of a determination process in accordance with a fifth embodiment.

As indicated in FIG. 10, the allowable upper limit angle Lvl calculated from the "E" map is a value that corresponds to a progressively greater lift working angle VL as the operation amount of accelerator AC becomes greater, or as the intake pressure PA becomes lower. This is based on the following reasons. That is, in the cooperation control in accordance with this embodiment, the working-angle changing control is executed so that the lift working angle VL becomes greater as the operation amount of accelerator AC becomes greater, or as, under the condition that the required amount of intake Tga is constant, the intake pressure PA becomes lower.

After that, the lift working angle VL is input (step S406), and it is judged whether a state (abnormal state) where the lift working angle VL is greater than the allowable upper limit angle Lvl has continued for a predetermined time or longer (step S408).

If the abnormal state has continued for the predetermined time or longer (YES at step S408), it is considered that an abnormality has occurred in the state of driving of the intake valve 30, and it is determined that the intake amount control mechanism is abnormal (step S410).

Conversely, if the abnormal state is not occurring or the duration of the abnormal state is less than the predetermined time (NO at step S408), it is considered that abnormality is not occurring in the state of driving of the intake valve 30 or that the abnormal state has not continued long enough to allow accurate determination of occurrence of abnormality. Thus, it is determined that the mechanism is normal (step S412).

After determination is made as to the presence or absence of abnormality in the intake amount control mechanism the process temporarily ends. As described above, this embodiment achieves the following advantages:

(1) The allowable upper limit angle Lvl for the lift working angle VL is set on the basis of the operation amount of accelerator AC and the intake pressure PA. If the lift working angle VL becomes greater than the allowable upper limit angle Lvl, it is determined that the intake amount control mechanism is abnormal. Therefore, it becomes possible to set, as the allowable upper limit angle Lvl, a value that enables precise judgment regarding the occurrence of a case where an abnormality occurs in the intake amount control mechanism and therefore the actual amount of intake becomes greater than the required amount of intake Tga by a predetermined amount or greater. Furthermore, on the basis of the event that the lift working angle VL has become greater than the allowable upper limit angle Lvl, it can be determined with good precision that the actual amount of intake has become greater than the required amount of intake Tga by a predetermined amount or greater. Therefore, even in the case where the throttle opening amount TA greatly changes in accordance with the lift working angle VL, the abnormality determination can be carried out in a manner that is appropriate for the case. Hence, it becomes possible to accurately carry out the determination as to abnormality in the state of driving of the intake valve 30, that is, abnormality of the intake amount control mechanism.

(2) Provided that the state where the lift working angle VL is greater than the allowable upper limit angle Lvl has continued for a predetermined time or longer, it is determined that an abnormality is occurring in the intake amount control mechanism. This makes it possible to avoid an accidental false determination, for example, a determination of abnormality made on the basis of an event that the lift working angle VL temporarily becomes greater than the allowable upper limit angle Lvl for some factor even though the state of driving of the intake valve 30 is a state that can be said to be normal. Therefore, it becomes possible to carry out the determination on abnormality regarding the state of driving of the intake valve 30 with an increased certainty.

(3) For the sake of the abnormality determination, the allowable upper limit angle Lvl for the lift working angle VL is set. Therefore, it becomes possible to accurately determine whether an abnormality where the lift working angle VL becomes greater than the allowable upper limit angle Lvl, that is, among the abnormalities in the driving of the intake valve 30, an abnormality that causes the engine power to be greater than necessary, has occurred.

(4) As the allowable upper limit angle Lvl, greater angles are set for lower intake pressured PA. Therefore, the allowable upper limit angle Lvl can be set in a manner that is appropriate for the relationship between the intake pressure PA and the lift working angle VL, that is, a manner in which the lift working angle VL is set greater as the intake pressure PA becomes lower under the condition that the required amount of intake Tga is constant. Hence, it becomes possible to carry out accurate abnormality determination.

A fifth embodiment in which the abnormality determination apparatus for an intake amount control mechanism of the invention is embodied will be hereinafter described.

The overall constitution of an internal combustion engine and its peripheral appliances to which the abnormality determination apparatus of this embodiment is applied is substantially the same as the constitution of the internal combustion engine 10 and its peripheral appliances shown in FIG. 1, and detailed description thereof will be omitted below. Furthermore, as for the engine controls in this embodiment, the aforementioned throttle control, the working-angle changing control, and the fuel injection control are also executed. The control manners of these controls are assumed to be substantially the same as those in the first embodiment, and detailed description thereof will be also omitted below.

In abnormality determination apparatuses that perform a determination process based on the intake pressure PA like the determination processes described above in conjunction with the second to fourth embodiments, the determination process is performed in a manner that is in accordance with the actual intake pressure PA, so that abnormality of the intake amount control mechanism can be determined with good precision. However, such abnormality determination apparatuses are unable to execute the determination process with good precision if an abnormality occurs in the intake pressure sensor 52.

In contrast, an abnormality determination apparatus that carries out abnormality determination without using the intake pressure PA as in the determination process described above in conjunction with the first embodiment has an advantage of being able to execute the determination process regardless of the presence or absence of abnormality of the intake pressure sensor 52, although it has slightly lower precision in determination as compared with the abnormality determination that uses the intake pressure PA.

Taking these circumstances into consideration, this embodiment executes the determination process as follows. As shown in FIG. 1, it is first judged whether the intake pressure sensor 52 is normal (step S500). In this step, it is judged that the intake pressure sensor 52 is abnormal, for example, if a detection signal that indicates very high pressure or a detection signal that indicates very low pressure has continued to be output from the intake pressure sensor 52.

If the intake pressure sensor 52 is normal (YES at step S500), the intake pressure PA is input and the abnormality determination based on the intake pressure PA is carried out (step S502). Concretely, the determination process according to the second embodiment (FIG. 5) is executed.

Conversely, if the intake pressure sensor 52 is abnormal (NO at step S500), the abnormal determination that does not use the intake pressure PA is carried out (step S504). Concretely, the determination process according to the first embodiment (FIG. 3) is executed.

Thus, in the determination process according to this embodiment, one of the abnormality determination based on the intake pressure PA and the abnormality determination that does not use the intake pressure PA is selectively executed.

As described above, this embodiment achieves the following advantages:

(1) If the intake pressure sensor 52 is normal, the determination process based on the intake pressure PA is carried out to make determination on abnormality of the intake amount control mechanism with good precision. If abnormality occurs in the intake pressure sensor 52, the determination process that does not use the intake pressure PA is carried out, so that the execution of the determination process can be continued.

The foregoing embodiments may be carried out with the following changes:

In the third embodiment, the correction factor Kp is calculated through the use of the intake pressure PA, which is an index value of the differential pressure between the upstream and downstream sides of the throttle valve 14. However, a pressure sensor for detecting the pressure PAi in the upstream side of the throttle valve 14 may be provided, and a correction factor may be calculated through the use of a difference between the pressure PAi and the intake pressure PA. This makes it possible to execute the determination process in a manner that is appropriate for the actual differential pressure. Therefore, it becomes possible to more accurately carry out the abnormality determination.

As for the abnormality determination based on the intake pressure PA which is executed in the fifth embodiment if the intake pressure sensor 52 is normal, it is also possible to execute the determination process according to the third embodiment (FIG. 6) or the determination process according to the fourth embodiment (FIG. 9) as well as the determination process according to the second embodiment.

In the foregoing embodiments, it is determined that the intake amount control mechanism is abnormal provided that the aforementioned abnormal state has continued for a predetermined time or longer. However, it may also be determined that the intake amount control mechanism is abnormal immediately after the abnormality state is entered, as long as the aforementioned accidental false determination can be properly avoided.

The foregoing embodiments are also applicable to internal combustion engines in which the throttle control and the working-angle changing control are executed in a manner that is in accordance with index values of the engine operation state, for example, the temperature of the engine cooling water, the engine rotational speed, etc., in addition to the operation amount of accelerator AC. In this constitution, due to the use of not only the operation amount of accelerator AC but also other index values of the engine operation state as calculation parameters for calculating the allowable upper limit opening amount or the allowable upper limit angle, it becomes possible to execute the abnormality determination with good precision.

In the foregoing embodiments, as a criterion value for use in the abnormality determination, an allowable upper limit value is set, such as the allowable upper limit opening amount or the allowable upper limit angle. Instead of or in addition to the allowable upper limit value, an allowable lower limit value may be set, such as an allowable lower limit opening amount or an allowable lower limit angle. In short, if an allowable range is set regarding the throttle opening amount TA or the lift working angle VL of the intake valve 30, it becomes possible to more accurately determine whether the intake amount control mechanism is abnormal. According to this constitution, it becomes possible to accurately determine whether, among the abnormalities regarding the intake amount control mechanism, an abnormality that causes the engine power to be smaller than necessary has occurred.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An abnormality determination apparatus for an intake amount control mechanism, comprising:

a control portion which sets an allowable range of an opening amount of a throttle valve, which is provided in an intake passageway of an internal combustion engine, based at least on an index value of an engine operation state, including an operation amount of an accelerator, and on a lift working angle of an intake valve, and which determines that an abnormality is present in a state of driving of the throttle valve if an actual opening amount of the throttle valve is outside the allowable range set.

2. The abnormality determination apparatus for an intake amount control mechanism according to claim 1, wherein the control portion determines that the abnormality is present, present based on a condition that a state where the actual opening amount of the throttle valve is outside the allowable range has continued for a predetermined duration or longer.

3. The abnormality determination apparatus for an intake amount control mechanism according to claim 1, wherein the control portion sets the allowable range by specifying an allowable upper limit value.

4. The abnormality determination apparatus for an intake amount control mechanism according to claim 1, further comprising:

an intake pressure detector device that detects an intake pressure in a portion of the intake passageway between the throttle valve and the intake valve, wherein the control portion sets the allowable range based on the intake pressure detected as well as the index value of the engine operation state and the lift working angle of the intake valve.

5. The abnormality determination apparatus for an intake amount control mechanism according to claim 4, wherein the control portion sets the allowable range so that the allowable range includes a greater opening amount as the intake pressure detected becomes higher.

* * * * *